Oct. 29, 1946. G. MURTAGH 2,410,299

SCREW OR THREADED ROD MOUNTING

Filed Aug. 3, 1943

INVENTOR
GILBERT MURTAGH
PER
ATTORNEY

Patented Oct. 29, 1946

2,410,299

UNITED STATES PATENT OFFICE 2,410,299

SCREW OR THREADED ROD MOUNTING

Gilbert Murtagh, Port Washington, N. Y.

Application August 3, 1943, Serial No. 497,176

2 Claims. (Cl. 72—105)

This invention is for a screw, threaded rod or nail fastening adapted to secure grounds, blocking, furring and building strips to masonry. One object is to provide a unit whereby a screw or nail may be positively imbedded into material of different character than the masonry itself and at the same time create a sturdy durable locking.

A further object is the production of a self contained unit adapted to be fitted into concrete or a mortar joint in masonry while these are soft and to provide upon the setting of the concrete or mortar a unit which will be locked in such a way that the lines of stress have their greatest geometric and mechanical values in a very small space. Thus a multiplicity of units may be easily utilized in certain operations without impairing the firmness of the supporting structure.

Another object is to provide a fastening to replace those types of fastenings such as toggle bolts, expansion bolts, anchor bolts and wood pluggings which are usually installed by cutting into the completed masonry.

In cases where material is inserted in the screw receiving portion of a character not adapted for gripping purposes such material may still be used since an offset planar support will lock a screw within the space of two predetermined sequential pitches thereof regardless of the backing. The backing may be a significant factor in certain cases where the unit is adapted to support heavy adjunctive loadings.

Figure 1:
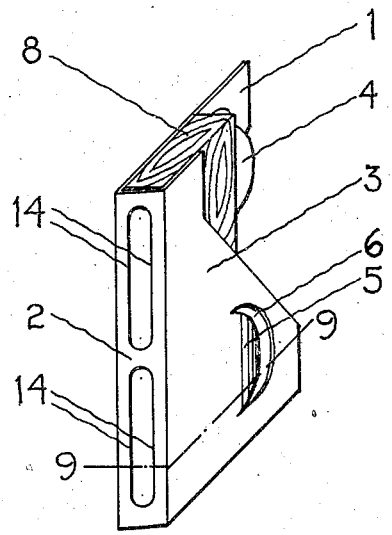
Figure 2:
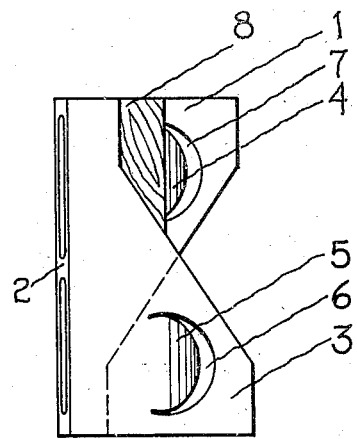
Figure 3:
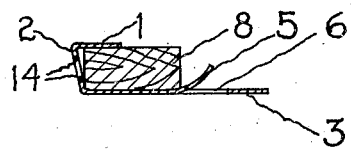
Figure 4:
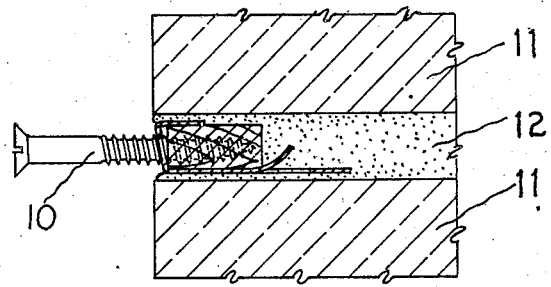

Other objects will be apparent from the description wherein Figure 1 is an isometric view, Figure 2 a side elevation, and Figure 3 a plan view along the lines 9—9 of Figure 1. Figure 4 shows a plan section of the unit installed in a masonry joint.

In the drawing 1, 2, and 3 show a thin sheet of metal or other hard surface material, forming a three sided enclosure with two parallel sides 1 and 3 and with the third or intervening side 2 disposed to form angles to sides 1 and 3, that are equal to the angles formed in any selected screw between the center line of such screw and a line projected from a tangent to the spiral thread thereof, thus positioning screw grip members 14.

Figure 6:
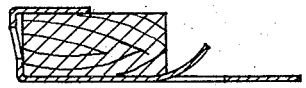
Figure 5:
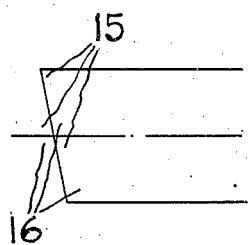

The relationship of angles is shown in Figure 5, where angles 15 are equal and angles 16 are likewise equal. Of course the entire face 2 does not have to bear angular relationship to faces 1 and 3 as just described provided the screw grip members 14 lie in a plane that bears such angular relationship. Figure 6, enlarged for emphasis, shows one condition that falls within this scope.

4 and 5 identify a plurality of ears representing extensions of the enclosure depending inwardly therefrom forming openings 6 and 7. These ears as shown in Figure 2 are turned in toward the center of the unit and act as spreaders to force mortar through the openings 6 and 7, thereby forming a bond with the mortar on the outside between the unit and the bricks or blocks of masonry. 8 shows a filler of pulp board, wood, or other material into which screws or threaded rods or nails can be turned or driven.

It will be noted that spaced apart screw grip members 14 constitute an offset planar support particularly shown in Figure 3 and Figure 4. In Figure 4 the screw 10 is shown partially imbedded in the filler 8, two sequential pitches thereof having been positively locked within the offset grip. 12 of Figure 4 represents the mortar between brick or masonry blocks 11 completely imbedding the sides and ears of the unit.

Operation

It is obvious that if the unit hereinbefore described is pushed into a wet mortar joint the mortar will be forced to flow through the openings 6 and 7 by reason of the disposition of ears 4 and 5 and the mortar upon hardening will securely lock the unit into the surrounding masonry.

Because of the screw grip members 14 disposed as hereinbefore described and spaced apart a distance equal to the core diameter of a screw, the screw or threaded rod is firmly gripped in two sequential pitches and is locked against displacement by the lines of stress flowing from the parallel slot lines transverse to the tangential lines of stress formed in the screw pitches. The further unique creation of transverse lines of stress may be seen in the disposition of the openings 6 and 7 in the sides 1 and 2 wherein the lines of stress are extended to the masonry through the mortar that fills these openings.

When the screw or threaded rod is inserted into the filler a secondary line of stress is caused to flow from the filler to the enclosing unit and when nails are used this becomes the initial line of stress.

What is claimed is:

1. A screw fastening unit comprising a metallic channel-shaped body having two side faces and a front face, one side face having its front edge offset from a plane perpendicular to the other side face and passing through the front edge of the second side face, the front face connecting the two front edges of the side faces to form said channel body, said front face being slotted, providing grip edges which are parallel to the front edges and are offset in the same sense as the front edges for engaging the opposite sides of the core of a screw inserted therebetween, said side faces having ears struck therefrom and projecting rearwardly into the space between the side faces, and a filler member confined in the channel body between the front face, the side faces and the ears for engaging and holding a screw.

2. A screw fastening unit comprising a metallic channel-shaped body having two congruent side faces of irregular shape set parallel to each other and a front connecting face, one side face having its front edge offset from a plane perpendicular to the other side face and passing through the front edge of the second side face, the front face connecting the two front edges of the side faces to form said channel body, said front face being slotted, providing grip edges which are parallel to the front edges and are offset in the same sense as the front edges for engaging the opposite sides of the core of a screw inserted therebetween, said side faces having ears struck therefrom and projecting rearwardly into the space between the side faces, and a filler member confined in the channel body between the front face, the side faces and the ears for engaging and holding a screw.

GILBERT MURTAGH.